United States Patent [19]
Lowder et al.

[11] 3,798,697
[45] Mar. 26, 1974

[54] FLOOR POLISHER

[75] Inventors: Dale E. Lowder, North Muskegon; Wilfred C. Nise, Spring Lake, both of Mich.

[73] Assignee: Clarke-Gravely Corporation, Muskegon, Mich.

[22] Filed: May 19, 1972

[21] Appl. No.: 255,003

[52] U.S. Cl. .................................. 15/49 R, 15/325
[51] Int. Cl. ..................... A47l 11/162, A47l 11/40
[58] Field of Search............ 15/49 R, 50 R, 98, 325, 15/412, 51, 52

[56] References Cited
UNITED STATES PATENTS

| | | | |
|---|---|---|---|
| 2,221,315 | 11/1940 | Okun | 15/49 R X |
| 2,241,862 | 5/1941 | Langille | 15/325 |
| 2,867,825 | 1/1959 | Ripple | 15/49 R |
| 3,216,047 | 11/1965 | Ernolf | 15/49 R X |
| 3,428,984 | 2/1969 | Collier | 15/49 R |

*Primary Examiner*—Edward L. Roberts
*Attorney, Agent, or Firm*—Price, Heneveld, Huizenga & Cooper

[57] ABSTRACT

A floor polishing machine having a brush housing and a motor housing with wheels and a handle secured thereto, in which a bumper enshrouds the brush housing, a plastic tire is mounted on each wheel and projects outwardly therefrom and a bumper enshrouds the motor housing. Portions of the plastic tire are in horizontal alignment with both the brush housing bumper and the motor housing bumper. The motor housing seats in a well on the brush housing with the mating surfaces being inclined at approximately 40° to 50°. A generally annular tongue projects from the motor housing and engages a mating groove in the brush housing bumper to thereby trap a portion of the brush housing bumper between the two housings. Different sized motors can be mounted in the motor housing on different steps of a number of stepped motor mounting ribs projecting inwardly from the sides of the motor housing. The handle includes a pair of grips projecting from a switch housing with the top surfaces of the handle being generally continuous with the top surfaces of the switch housing and defining a generally arcuate surface against which an operator can push his body. There is a separate switch lever on each handle grip for controlling a separate switch within the handle grip for controlling a separate switch within the switch housing, each of which switches independently controls the motor. If desired, one of the switches can be wired to an accessory through a knockout wiring hole in the switch housing. Finally, the switch housing includes a nose projecting therefrom to protect the connection of the electrical cord to the machine.

18 Claims, 10 Drawing Figures

FLOOR POLISHER

BACKGROUND OF THE INVENTION

The present invention relates to cleaning machines, particularly those employing a motor-driven brush. The invention is particularly adaptable for use in a floor polishing machine.

For years, floor polishing machines have been manufactured with a large brush housing having some type of bumper thereon to prevent damage to furniture and woodwork during usage of the machine. Apparently because this was thought to be satisfactory, certain bumper problems have been overlooked by the art. Thus, the wheels or a protruding axle of the wheel may ram a desk, chair or woodwork. If the brush housing slides under a desk or chair, the motor housing rams the desk or chair. The best which has been done to minimize this problem is to place a narrow bumper bead around the motor housing.

For many years, even the brush housing bumper comprised merely a bead trapped in some type of retaining channel. Attempts have been made to use larger bumpers by actually adhering the bumpers to the brush housing with glue. These bumpers, however, tend to peel away from the motor housing, particularly at the peripheral areas of the bumper.

Another drawback currently encountered is that those using floor cleaning machines, such as floor polishers, frequently require machines of varying sizes. Thus, a manufacturer might have to manufacture three different sized machines having three different sized brushes, three different sized motors, three different sized motor housings and three different sized brush housings. This results in additional manufacturing expenses which must of course be passed onto the consumers. One prior art machine utilizes a separate brush housing which can be secured to a motor housing by bolts passing through apertures therein. This enables the manufacturer to use one motor housing and motor with different sized brush housings. Unfortunately, a great deal of stress is placed on the bolts when the housing sharply strikes a solid object, such as a wall, and the bolts may shear. Further, one still has to employ a different motor and motor housing for widely divergent sized brushes.

Prior art floor machines require some type of switching mechanism for activating and deactivating the motor. This requires a bulky switch housing which is positioned generally at the top of the handle. This switch housing actually makes the machine uncomfortable to operate, since operators frequently push the machines with their bodies by pressing against the top of the handle. Another comfort factor which has gone unappreciated in the art is that the switch levers which are generally positioned adjacent the handles are uncomfortable to grasp and hold in conjunction with the handles. This is particularly true where a person with small hands must simultaneously grasp not only the handle but also the switch lever.

Positioning the switch housing at the top of the handle has also lead to difficulties. The electric cord which powers the machine must be secured to the switch housing generally at the back thereof for most convenient location. The handles are frequently dropped or allowed to drop to the floor. When this happens, the cord tends to hit first, and frequent droppings lead to deterioration of the juncture between the cord and switch housing. In extreme cases, the cord may actually be separated from the switches, or the insulation thereon may become cracked and damaged.

Finally, the switching mechanisms used to activate motors in prior art floor machines have been a constant source of difficulty. The motors used in such machines have been designed to reach peak power outputs in a very short length of time. This requires tremendously high starter currents. Accordingly, the switches employed in such machines are subject to frequent burnout.

While prior art floor machines have been acceptable, the above and other problems have been a continual source of nagging difficulty. Accordingly, it is an object of the present invention to provide a floor cleaning machine which is so superior to prior art machines that the above encountered difficulties are obviated or at least minimized.

SUMMARY OF THE INVENTION

The floor machine of the present invention substantially eliminates damaged furniture and woodworking with an all-encompassing bumper system. The brush housing includes a bumper of resiliently compressible material enshrouding at least a portion of the sides and top. There is a tire for each wheel made of resiliently compressible material which protrudes beyond the outside edge of the wheel and beyond any other protrusions from the wheel. A motor housing bumper enshrouds at least a portion of the sides of the motor housing. The lower portions of the wheels are in horizontal alignment with at least the upper portions of the brush housing bumper and the upper portions of the wheels are in alignment with at least the lower portions of the motor housing bumper. Thus, if the floor machine contacts an article of furniture or the wall, it does so through a brush housing bumper, or a wheel bumper, or a motor housing bumper, there being no gaps in the horizontal areas between these succeeding bumper elements.

To facilitate securance of the top peripheral edge of the brush housing bumper, the peripheral edge thereof is trapped between the motor housing and the brush housing. Specifically, a tongue projecting from the edge of the motor housing engages a receiving groove in the brush housing bumper to positively hold the latter in place. Preferably, an inner groove near the lower edge of the brush housing bumper is matingly engaged by a tongue projecting from the brush housing. This aids to positively lock the bumper in place, preventing tendencies of the bumper to slide with respect to the bumper housing. In fact, the necessity for gluing the interface between the bumper and housing is eliminated.

The floor machine of the present invention can be manufactured more economically in a variety of different sizes with a lesser number of different parts. This makes possible a machine which can be sold more economically or into which greater quality can be built at no additional expense to the purchaser. This is accomplished in one instance by the fact that several different sized brush housings can be secured to the same motor housing. Effective interconnection is achieved by providing in the brush housing a receiving well into which a mounting insert projecting downwardly from the motor housing can be inserted. The mating faces of the insert and receiving well are inclined at an angle with respect to the vertical and with respect to the horizontal whereby generally horizontal shock forces applied to the brush housing are transmitted to the motor housing at least in part through said matingly engaging surfaces. This substantially eliminates the possibility of shearing interconnecting bolts between the two.

The variety of different parts needed is further minimized by the provision of a motor housing which can be used on several different sized motors. The motor housing includes a plurality of motor mounting ribs projecting inwardly from the sides of the motor housing. Each of these ribs includes at least a first and second step upon which motors of at least two different dimensions can be seated and secured. Thus, a variety of floor machines can be manufactured using the same motor housing.

Comfort of operation is greatly improved in the present invention by providing hand grips projecting laterally from either side of the switch housing at the top of the handle in such a way that the top surface of each of the hand grips is generally continuous with the top surface of the switch housing. Further, the handles are inclined at an angle such that the upper surfaces of the handles and switch housing define a generally continuous, generally arcuate surface against which an operator can rest his body to aid in propelling the machine. Preferably, there is a switch lever on each hand grip which is mounted within a recess in the hand grip, the lever projecting out of the recess, but being generally within the recess and nearly flush with the handle when depressed.

Mounted within the switch housing are two separate switches, each of which controls the operation of the motor. Each of the two separate levers is connected to a separate one of the switches whereby an operator will sometimes start the machine by operating one switch and will sometimes start the machine by operating the other switch. Accordingly, the total life span of the two switches jointly is substantially increased in spite of the high starting currents which the switches must take when the machine is first started up.

The switch housing itself is improved in several respects. For example, the switch housing includes a knockout wiring hole whereby one of the two switches can be disconnected from the motor and can be wired to an attachment to the machine by means of a wire passing through the knockout hole. To facilitate wear and tear on the electrical cord which is connected to the housing, the housing includes a nose projecting rearwardly therefrom. The electrical cord joins the housing along the bottom surface of the nose. Thus when the handle of the machine is inadvertently allowed to drop to the floor, the nose hits the floor instead of the strain relief cord connector hitting the floor.

These and other objects and advantages of the present invention will be further understood and appreciated by reference to the written specification and appended drawings.

PREFERRED EMBODIMENT OF THE INVENTION

Figure 1:
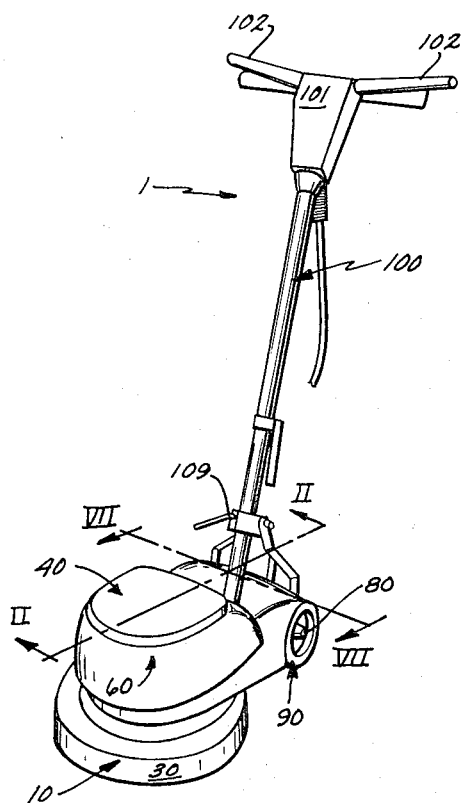
FIG. 1 is a perspective view of a floor machine constructed in accordance with the present invention.
Figure 7:
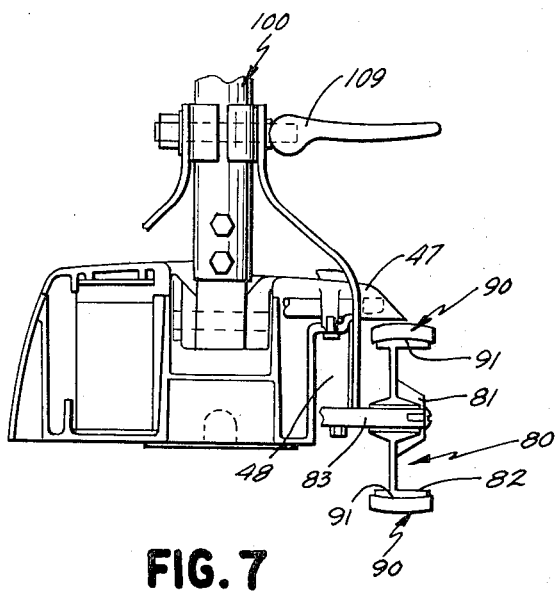
FIG. 7 is a cross-sectional view taken along plane VII—VII of FIG. 1.
Figure 2:
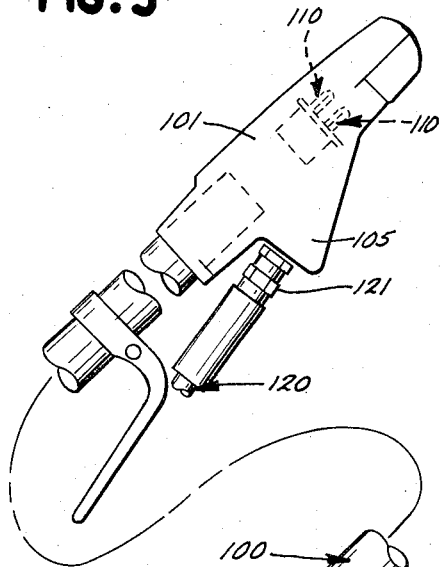
FIG. 2 is a partially generally cross-sectional view taken along plane II—II of FIG. 1.
Figure 2:
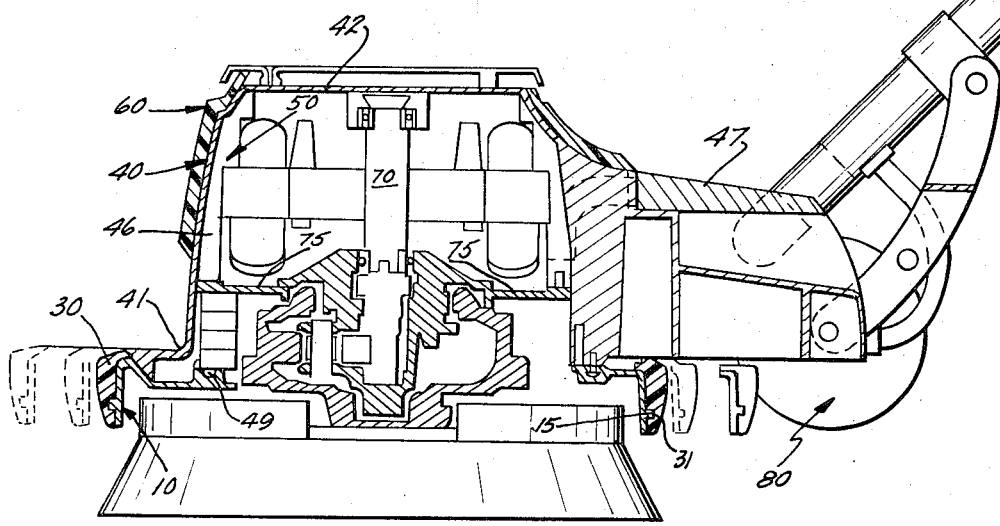
Figure 8:
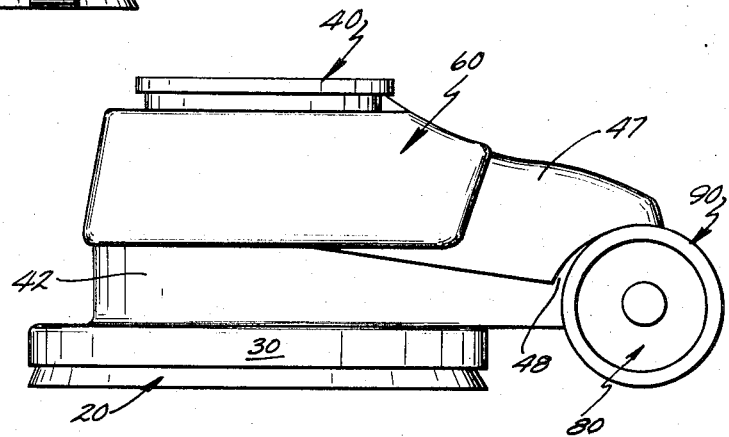
FIG. 8 is a side elevational view of the brush housing and motor housing assembly.

In the preferred embodiment, the floor polisher 1 includes a brush housing 10 for a brush 20 (FIGS. 1 and 2). Brush housing 10 is secured to a motor housing 40 for motor 70. A pair of wheels 80 are mounted at the rear of motor housing 40 and a handle 100 projects upwardly therefrom. Brush housing bumper 30 enshrouds brush housing 10 and motor housing bumper 60 generally enshrouds motor housing 40. The gap between the two bumpers and at the rear of motor housing 40 is filled by tires 90 on wheels 80. Tires 90 are made of a resiliently compressible material and which project beyond the edges of wheels 80 and beyond any other protrusions therefrom (FIG. 7). The bottom portions of tires 90 are in horizontal alignment with the top portions of brush housing bumper 30 and the top portions of tires 90 are in horizontal alignment with the lower portions of motor housing bumper 60 (FIG. 8).

Figure 4:
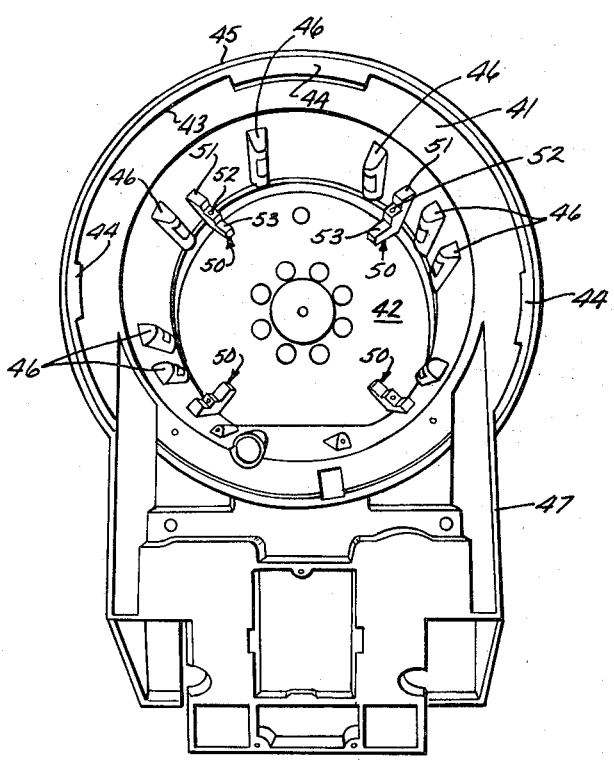
FIG. 4 is a bottom plan view of the motor housing.
Figure 3:
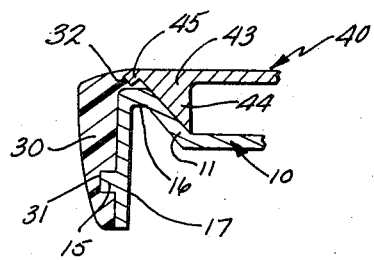
FIG. 3 is a fragmentary cross-sectional view of the juncture between the motor housing and the brush housing.

Several different sized brush housings 10 can be joined to motor housing 40 (FIG. 2). Each brush housing 10 includes a receiving well 11 therein into which motor housing 40 is inserted. A tongue 45 on motor housing 40 matingly engages a groove 32 in brush housing bumper 30 to thereby trap the peripheral portion of brush housing bumper 30 between motor housing 40 and brush housing 10 (FIG. 3). To facilitate the use of different sized motors, motor housing 40 includes motor mounting ribs 50 projecting radially inwardly therefrom and including several steps 51, 52 and 53 on which motors of different sizes can be mounted (FIG. 4).

Figure 10:
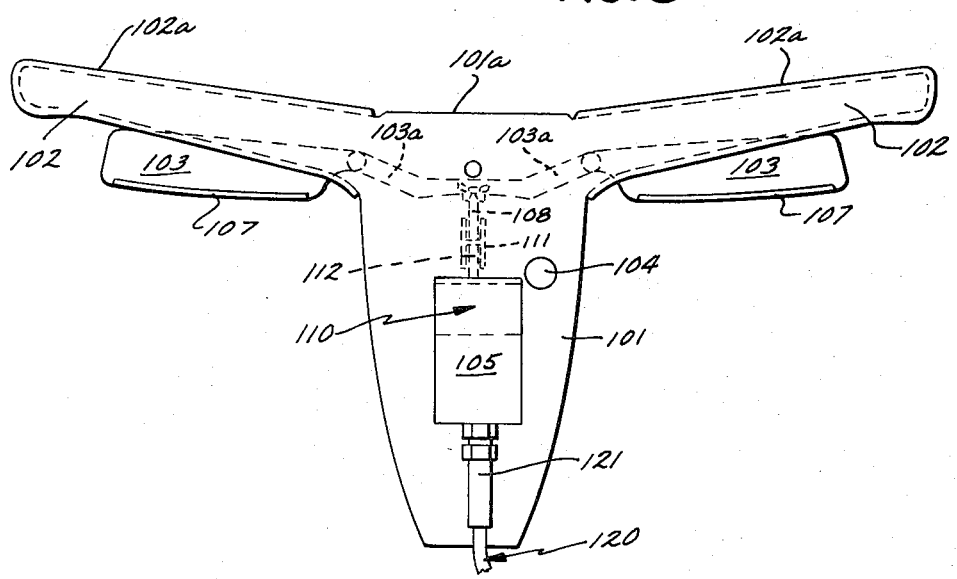
FIG. 10 is a rear elevational view of the switch housing and handle grip assembly which is positioned at the top of the handle.

Handle 100 projecting upwardly from the rear of motor housing 40 includes a switch housing 101 at the top thereof with a pair of hand grips 102 projecting laterally from either side thereof (FIG. 1). The top surfaces of handles 102 are generally continuous with the top surface of switch housing 101 and define a gradual arc into which a person can nest his body to aid in pushing the machine (FIG. 10). Positioned within switch housing 101 are a pair of microswitches 110, each of which independently controls motor 70. Each switch 110 is in turn controlled by a switch lever 103 recessibly mounted on a hand grip 102 (FIG. 10). Switch housing 101 itself includes a rearwardly projecting cord mounting nose 105 which protects the cord 120 and its connection 121 (FIG. 2). Switch housing 101 also includes a knockout 104 which can be removed whereby a cord can be passed therethrough and connected to a switch 110 at one end and to an accessory mounted on floor machine 1 at the other end (FIG. 10).

Figure 5:
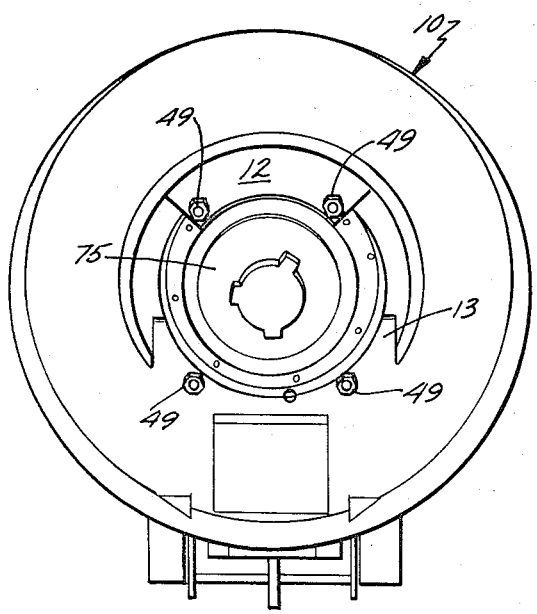
FIG. 5 is a bottom plan view of the brush housing joined to the motor housing.

Brush housing 10 is cast or formed of steel or the like in the shape of a generally annular ring 16 and a downwardly depending outside wall 17 (FIGS. 5 and 2). As is shown in FIG. 2, brush housing 10 in the preferred embodiment comes in three different sizes for three different sized brushes 20. Projecting inwardly and downwardly from the inner circumference of ring 16 is a generally annular flange encompassing approximately two-thirds of the inner circumference of the ring and defining a receiving well 11 into which motor housing 40 can be seated. Projecting inwardly from the front of receiving well 11 is a front mounting flange 12 including apertures 12a therein through which bolts 49 can be passed for securing to motor housing 40. Projecting inwardly from the rear of brush housing 10 is a rear securing flange 13 having apertures 13a therein, also for bolts 49. Brush housing 10 also includes a well 14 at the rear thereof into which various electrical components for motor 70 can be mounted if desired or necessary. Finally, brush housing 10 includes a rib or tongue 15 projecting radially outwardly therefrom, generally around the circumference of outside wall 17 for engaging a receiving groove 31 in brush housing bumper 30 (FIG. 3).

Brush 20 is conventional and is secured directly to motor 70 in a conventional manner (FIG. 2). At least the upper portions of brush 20 are enshrouded by brush housing 10 during operation of floor machine 1.

Brush housing bumper 30 is made of a resiliently compressible material such as rubber, soft vinyl plastic or the like. It generally enshrouds both the downwardly depending sides 17 and the top ring 16 of brush housing 19 (FIG. 2). Brush housing bumper 30 is secured to housing 10 by means of mechanical interconnections. Brush housing bumper 30 includes an annular groove 31 generally at the bottom and to the inside thereof which matingly receives tongue 15 of brush housing 10. Brush housing bumper 30 also includes an outwardly opening upper groove 32 extending a little over half the distance around the inner circumference thereof for mating engagement with tongue 45 of motor housing 40 (FIG. 3 and 5). These mating engagements act as a positive lock on brush housing bumper 30 and prevent the tendency for bumper 30 to slip or slide when it bumps against a wall or the like.

Figure 9:
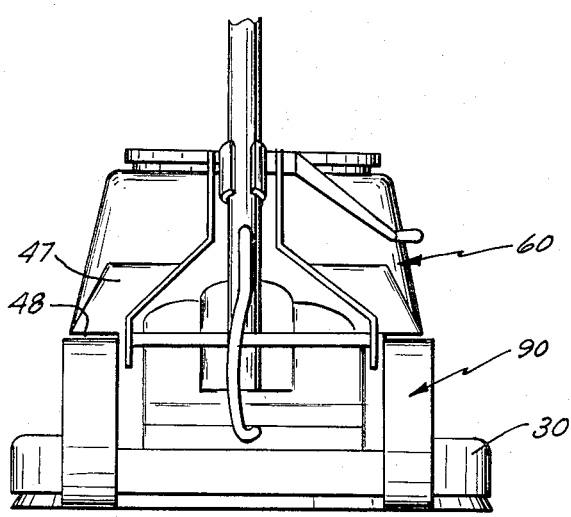
FIG. 9 is a side elevational view of the brush housing and motor housing assembly.

Motor housing 40 is a generally hat-shaped aluminum die casting having a rim 41 and an upwardly projecting dome 42 (FIGS. 2 and 4). Projecting rearwardly from dome 42 is a rear chassis 47 (FIGS. 2 and 8). Rear chassis 47 is generally rectangular in configuration and includes a wheel well 48 at either side thereof within which a wheel 80 is mounted (FIGS. 7, 8 and 9). Rim 41 terminates at a downwardly and inwardly sloping circumferential lip 43 which extends approximately two-thirds of the distance around the circumference of rim 41. Projecting inwardly and downwardly from the termination of lip 43 are three insert flanges 44 positioned at spaced intervals around the inner circumference of lip 43. Together, lip 43 and insert flanges 44 constitute an insert which is seated in receiving well 11 of brush housing 10. The mating surfaces of lip 43, insert flanges 44 and receiving well 11 are identically sloped at an angle of between 40 and 50 degrees to the vertical or to the horizontal. It is important that this angle be sufficiently great with respect to the horizontal that motor housing 40 can be easily inserted into receiving well 11 and will not fall through. On the other hand, it is important that the angle be sufficiently great with respect to the vertical so as to maximize the transmission of horizontal shock forces applied to brush housing 10 through the matingly engaging surfaces to motor housing 40. This eases the stress forces on the interconnecting bolts 49 between brush housing 10 and motor housing 40 and minimizes the chances of those bolts shearing.

Lip 43 also includes an outwardly projecting tongue 45 which matingly engages upper groove 32 on brush housing bumper 30 (FIGS. 3 and 4). This mating engagement serves to lock the peripheral edge of brush housing bumper 30 between tongue 45 and the top of brush housing 10.

Figure 6:
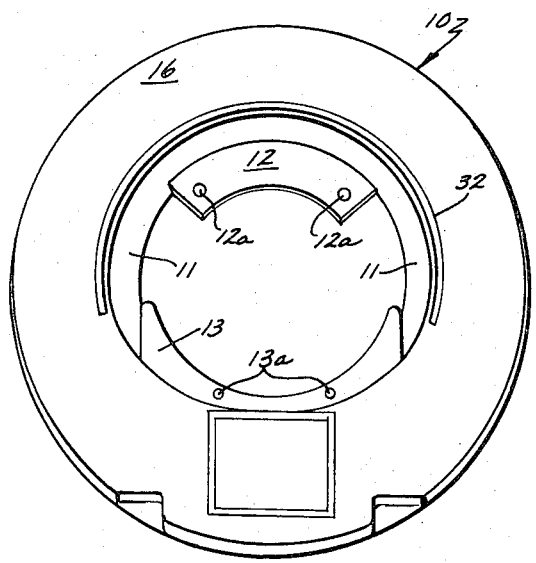
FIG. 6 is a top plan view of the brush housing.

Motor housing 40 includes a plurality of mounts 46 projecting radially inwardly from the sidewalls of dome 42. In securing brush housing 10 to motor housing 40, bolts 49 are passed through the apertures 12a and 13a and are threaded ultimately into various mounts 46 (FIGS. 2, 4, 5 and 6). Additional mounts 46 are provided for securing a cover plate 75 over motor 70 (FIGS. 2 and 6).

Also projecting inwardly from the sides of dome 42 are a plurality of motor mounting ribs 50 (FIG. 4). Each motor mounting rib 50 includes three steps thereon on which different sized motors can be mounted. The top step 51 is located towards the bottom of dome 42, bottom step 53 is positioned towards the top of dome 42 and intermediate step 52 is positioned therebetween. Each of the steps projects radially inwardly farther as one proceeds from bottom to top of dome 42. While theoretically one could mount a motor on any of the three steps, it has been found practical to use only the bottom two steps, bottom step 53 and intermediate step 52. A smaller powered motor can be mounted on intermediate step 52 and two higher powered motors of differing power outputs but of the same diameter can be mounted on bottom step 53.

It is primarily important that motor mounting ribs 50 provide separate motor mounting platforms at different levels and at different radial positions within dome 42. However, it is preferable that these platforms be defined by a plurality of ribs 50 rather than by complete annular rings positioned at various levels within dome 42. The use of ribs allows for greater tolerance since the area of contact between the inner edge of each rib 50 and motor 70 is less than would be the area of contact between the inner wall of an annular step and motor 70. Further, the space between the inside radius of a particular step and the inside wall of dome 42 provides a space into which protrusions from motor 70 can be accommodated.

Bumper 60 for motor housing 40 is made of the same material as brush housing bumper 30. Motor housing bumper 60 enshrouds generally the sides of dome 42 and a portion of the top and sides of chassis 47 (FIGS. 2 and 8). It is important that bumper 60 extend a sufficient distance from the top of dome 42 downwardly that its lower portions are in horizontal alignment at least with the upper portions of tire 90. This prevents a portion of the rear chassis 47 in horizontal alignment with the gap between motor housing bumper 60 and brush housing bumper 30 to ram into an article of furniture or the like since tires 90 act as bumpers in this gap area.

Motor 70 is conventional in nature and is joined to brush 20 in a conventional fashion. As hereinabove described, motor 70 may be of varying sizes and still be accommodated within dome 42 of motor housing 40. A cover plate 75 is secured over motor 70 is a manner hereinabove described to minimize the opportunity for dust or dirt and the like to get into motor 70.

Each wheel 80 which is mounted within wheel well 48 comprises a hub 81 mounted on an axle 83 (FIG. 7). A generally flat plate projects radially outwardly from hub 81 and joins a laterally projecting wheel rim 82.

The tires 90 for wheels 80 are made of the same general type of material as brush housing bumper 30 and motor housing bumper 60. In effect, they constitute bumpers in and of themselves. Each tire 90 includes an inner annular channel 91 therein into which rim 82 of wheel 80 is inserted. The edges of each tire 90 overhang and project laterally outwardly beyond the edges of rim 82 and beyond the outer limits of hub 81 and axle 83. Thus, if a wheel 80 bumps any object, it will do so through its bumper tire 90, rather than through a solid, sharp portion thereof. In this regard, it is important that each wheel 80 itself be mounted so that tire 90 projects outwardly from the confines of wheel well 48 in rear chassis 47. Thus it will be observed in FIG. 9 that as viewed from the rear, the outer silhouette of brush housing 10 and motor housing 40 is defined by the exterior of brush housing bumper 30, tire bumpers 90 or motor housing bumper 60. The only exception to this is that the very top of motor housing 40 is defined by a cover plate. Similarly, it will be noted in FIG. 8 that the bottom portions of bumper tire 90 are in horizontal alignement with the upper portions of brush housing bumper 30 while the top portions of bumper tire 90 are in horizontal alignment with the lower portions of motor housing bumper 60. By providing this interacting cooperation between these three separate bumper members, one is reasonably assured that if floor polisher 1 strikes a wall or article of furniture, it will do so only through a resiliently compressible bumper member.

Handle 100 is pivotally mounted to rear chassis 47 and includes a conventional clamping assembly 109 for adjusting the position thereof (FIGS. 1 and 7). Mounted at the top of handle 100 is switch housing 101 having a pair of switches 110 mounted therein (FIGS. 1 and 2). A grip 102 projects laterally from either side of switch housing 101, inclined generally at a gradual angle with respect thereto (FIG. 10). The top surfaces 102a are generally continuous with the top surface 101a of switch housing 101 and define therewith a generally continuous, arcuate surface against which the body of an operator can be comfortably nested. This allows the operator to push against floor polisher 1 with his body, as well as with his arms.

Each grip 102 includes a recess in the bottom thereof within which and from which a switch lever 103 projects. Each switch lever 103 is pivotally mounted within grip 102 and includes a contacting member 103a projecting into switch housing 101 into operable connection with one of the switches 110. Each switch lever 103 includes a gripping plate 107 at the bottom thereof which defines a smooth, gripping surface. In order to activate one of the switches 110, one merely compresses switch lever 103 inwardly with respect to handle grip 102. Because of the recess mounting of each switch lever 103, this inward compression makes gripping plate 107 generally flush with the surface of hand grip 102, thereby providing a comfortable means of simultaneously grasping grip 102 and holding down switch lever 103 (see phantom position in FIG. 10)

Each microswitch 110 includes a button 112 thereon which is captured by a "H" connector 111. H connector 111 is a tubular member having a central wall dividing the tube into two parts. It is referred to as a H connector because it is generally H-shaped in cross-sectional configuration. A linking pin 108 is pivotally connected to the end of each switch lever 103, specifically to the end of contacting member 103a, and is inserted into the other end of H connector 111. Thus, depression of switch lever 103 causes contacting member 103a to move downwardly with respect to switches 110 and to depress button 112 through the action of linking pin 108 and H connector 111.

Each switch 110 is a conventional microswitch and is independently operably connected to motor 70. Thus, the depression of either switch lever 103 results in the activation of motor 70. Switch housing 101 includes a knockout 104 therein which can be removed to allow one to pass an electrical cord therethrough into the interior of switch housing 101. This allows one to connect either one of the two switches 110 to some type of accessory which can be mounted on floor polisher 1.

Switch housing 101 also includes a cord mounting nose 105 projecting rearwardly therefrom (FIGS. 2 and 10). This part is designated a "nose" because of its generally nose-like configuration. The electrical cord 120 for floor polisher 1 is operably connected to switch housing 101 by means of a cord connector 121 secured at the base or bottom of nose 105. Cord connector 121 includes a strain relief spring means to better distribute forces applied to the connection when the cord is pulled on. Nose 105 projects beyond the plane of cord connector 121 such that when handle 100 is accidentally dropped, nose 105, rather than cord connector 121, hits the floor. This minimizes damage to cord connector 121 or to cord 120 at its point of juncture with switch housing 101.

OPERATION

Floor polisher 1 is the first floor polisher which can be operated without fear of damage to woodwork, walls or articles of furniture in the room. Because of the horizontal alignment of portions of tire bumper 90 with portions of the enshrouding motor housing bumper 60 and with portions of the enshrouding brush housing bumper 30, an operator can be almost 100 percent sure that if floor polisher 1 hits anything, it will do so with one of these three bumper members. Each tire 90 projects laterally outwardly beyond all other portions of wheel 80 and beyond the confines of wheel well 48 to insure protection from the rear chassis 47 of motor housing 40 and from any protrusions from wheel 80. Bumpers 30 and 60 do the rest of the job between them.

Brush housing bumper 30 is positively held in place through the interaction of groove 32 with tongue 45 on motor housing 40. Similarly, tongue 15 on brush housing 10 engages a bottom groove 31 on brush housing bumper 30. These positive locks aid in preventing brush housing bumper 30 from shearing away from the surface of brush housing 10. This makes practically feasable the use of an all enshrouding bumper 30.

Several different sizes of brush housings 10 can be secured to motor housing 40. Proper shock-absorbing interconnection is achieved because the lip 43 and insert flanges 44 of motor housing 40 are matingly inserted into a receiving well 11 in bumper housing 10. The mating surfaces, being inclined at the same angle with respect to the horizontal and vertical, serve to prevent shock forces applied to brush housing 10 from shearing the bolts 49 which secure brush housing 10 to motor housing 40.

Motor 70 is mounted to one of the sets of steps on motor mounting ribs 50. The provision of a plurality of such mounting steps makes it possible to mount motors 70 of different sizes within motor housing 40.

Comfort in operation is effected by providing the generally continuous, arcuate top surface defined by the upper surfaces of handle grips 102 and switch housing 101. The recessed mounted switch levers 103 render it comfortable for an operator to simultaneously grasp handle grips 102 and compress switch levers 103.

The provision of two independent switches 110, each of which independently operates a motor 70 helps to insure a greater combined life for the switches 110 and thereby minimizes the necessity for switch repair in floor polisher 1. Knockout 104 in switch housing 101 can be removed to allow one to wire one or the other of switches 110 to an accessory. Finally, the projecting nose 105 on switch housing 101 prevents damage to cord 120 or cord connector 121 in the event that handle 100 is accidentally dropped.

Of course, it is understood that the above is merely a preferred embodiment of the invention and that many changes and alterations can be made threreof without departing from its spirit and broader aspects.

The embodiments of the invention in which an exclusive property or privilege is claimed are defined as follows:

1. In a floor machine having a motor housing for a motor, a brush housing for a driven floor treating element such as a brush or the like and wheels, the improvement comprising: a brush housing bumper of resiliently compressible material enshrouding at least a portion of the sides and the top of said brush housing; a tire for each of said wheels, said tire being of a resiliently compressible material and protruding beyond the outside edge of said wheel and beyond any protrusions therefrom; at least the lower portions of said tire lying in horizontal alignment with a portion of said brush housing bumper; a motor housing bumper enshrouding at least a portion of the sides of said motor housing and extending from a level horizontally aligned with at least the upper portions of said tire to generally the top of said motor housing, whereby when said floor machine contacts an object, the object hits either said brush housing bumper, one of said tires or said motor housing bumper.

2. The machine of claim 1 in which said brush housing bumper enshrouds generally all exposed portions of said brush housing.

3. The floor machine of claim 2 in which said motor housing includes a rearwardly projecting chassis having a pair of said wheels secured thereto, one on either side thereof; said rear chassis including wheel wells therein in which said wheels are mounted; said tires projecting beyond the confines of said wheel wells to thereby act as a rear bumper for said chassis.

4. The floor machine of claim 1 in which portions of said brush housing bumper are captured between said brush housing and said motor housing to thereby aid in locking said brush housing bumper in place.

5. The floor machine of claim 4 in which said brush housing bumper includes a groove therein; said motor housing including a tongue projecting therefrom and matingly engaging said groove to thereby lock said brush housing bumper in place.

6. The floor machine of claim 5 in which said brush housing bumper includes a second groove therein, generally at the base thereof; said brush housing including a tongue projecting therefrom and engaging said second groove to thereby further lock said brush housing bumper in place.

7. In a floor machine having a motor housing for a motor and a brush housing for a motor-driven floor treating element such as a brush or the like, the improvement comprising: a brush housing bumper of resiliently compressible material enshrouding at least a portion of the sides and top of said brush housing; said motor housing including a portion overlying said bumper, said overlying portion including a tongue projecting therefrom; said bumper including a grove receiving said tongue whereby said bumper is held in place at least partially by the interaction of said tongue and said groove.

8. The floor machine of claim 7 in which said brush housing comprises a generally annular ring and said motor housing comprises a generally dome-shaped member; said tongue projecting generally from the circumferential edge of said motor housing and being generally annular in configuration; said groove being similarly generally annular in configuration.

9. The floor machine of claim 8 in which said brush housing bumper includes a second annular groove therein positioned against said brush housing, generally at the bottom of said bumper; said brush housing including a tongue projecting therefrom into mating engagement with said second groove.

10. The floor machine of claim 7 in which said brush housing bumper includes a second annular groove therein positioned against said brush housing, generally at the bottom of said bumper; said brush housing including a tongue projecting therefrom into mating engagement with said second groove.

11. The floor machine of claim 7 comprising: said brush housing including a receiving well; said motor housing including insert means for mating insertion into said receiving well; said insert means and said receiving well including mating surfaces which are inclined at an angle with respect to the vertical and with respect to the horizontal whereby generally horizontal shock forces on said brush housing are transmitted to said motor housing at least in part through said mating surfaces; said brush housing including a generally annular ring extending outwardly from its juncture with said well, said ring surface deviating from said inclined surface of said insert means to thereby define a space between said ring surface and said insert means; said brush housing bumper extending into said space between said ring and said insert means, said tongue extending generally downwardly from the surface of said insert means into said space between said insert means and said ring and said groove being located in that portion of said bumper which lies in said space between said insert means and said ring whereby said brush housing bumper is locked in position in said space.

12. In a floor machine having a motor housing for a motor, a brush housing for a driven floor treating element such as a brush or the like and wheels, the improvement comprising: said brush housing including a receiving well; said motor housing including insert means for mating insertion into said receiving well; said insert means and said receiving well including mating surfaces which are inclined at an angle with respect to the vertical and with respect to the horizontal whereby generally horizontal shock forces on said brush housing are transmitted to said motor housing at least in part through said mating surfaces; a brush housing bumper of resiliently compressible material enshrouding at least a portion of the sides and top of said brush housing; said motor housing including a portion overlying said bumper, said overlying portion including a tongue projecting therefrom; said bumper including a groove receiving said tongue whereby said bumper is held in place at least partially by the interaction of said tongue and said groove; a tire for each of said wheels, said tire being of a resiliently compressible material and protruding beyond the outside edge of said wheel and beyond any protrusions therefrom; at least the lower portions of said tire lying in horizontal alignment with a portion of said brush housing bumper; a motor housing bumper enshrouding at least a portion of the sides of said motor housing and extending from a level horizontally aligned with at least the upper portions of said tire to generally the top of said motor housing, whereby when said floor machine contacts an object, the object hits either said brush housing bumper, one of said tires or said motor housing bumper.

13. The machine of claim 12 comprising: means defining a plurality of motor mounting platforms projecting inwardly from the sides of said motor housing; each of said platforms projecting inwardly to a different radius and each being positioned at a different level within said housing whereby different sized motors can be mounted on different ones of said platforms.

14. The floor machine of claim 13 in which said defining means comprises a plurality of motor mounting ribs projecting inwardly from the sides of said motor housing; each of said ribs including at least a first and a second step upon which motors of at least two different dimensions can be seated and secured.

15. The floor machine of claim 12 comprising: a handle operably connected to said motor housing; a switch housing at the upper end of said handle; a hand grip projecting laterally from either side of said switch housing, the top surface of each of said grips being generally continuous with the top surface of said switch housing and defining in conjunction therewith a generally continuous, generally arcuate surface against which an operator can nest his body to aid in propelling said floor machine.

16. The floor machine of claim 15 in which each of said hand grips includes a recess therein; a switch lever being mounted on each of said grips within said recess, said lever projecting out of said recess but being generally within said recess and flush with said grip surface when depressed.

17. The floor machine of claim 12 comprising: a handle operably connected to said motor housing; a switch housing at the top of said handle; two separate switches mounted in said switch housing; each of said switches being operably connected to said driven element for independently controlling said driven element; a separate actuating means operably connected to each of said switches whereby said driven element can be operated by activating either one or the other of said separate activating means.

18. The floor machine of claim 17 comprising: said switch housing including a nose projecting rearwardly therfrom; an electrical cord being operably connected to said switch housing at the bottom of said nose; said nose projecting beyond the point of connection of said cord with the bottom of said nose whereby when said handle is accidentally dropped, said nose contacts the floor first, thereby preventing damage to the interconnection between said cord and said switch housing.

* * * * *